United States Patent
Duan et al.

(10) Patent No.: US 10,996,134 B2
(45) Date of Patent: May 4, 2021

(54) COOLANT LEAK DIAGNOSIS

(71) Applicant: GM Global Technology Operations LLC, Detroit, MI (US)

(72) Inventors: Shiming Duan, Ann Arbor, MI (US); Paul E. Krajewski, Troy, MI (US); Christopher H. Knieper, Chesaning, MI (US); Calvin Wang, Sterling Heights, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 227 days.

(21) Appl. No.: 16/427,889

(22) Filed: May 31, 2019

(65) Prior Publication Data

US 2020/0378863 A1    Dec. 3, 2020

(51) Int. Cl.
| | | |
|---|---|---|
| *G01M 15/04* | (2006.01) | |
| *G01M 3/32* | (2006.01) | |
| *F01P 11/18* | (2006.01) | |

(52) U.S. Cl.
CPC ........... *G01M 3/3245* (2013.01); *F01P 11/18* (2013.01); *G01M 15/042* (2013.01); *F01P 2025/70* (2013.01); *F01P 2031/18* (2013.01)

(58) Field of Classification Search
CPC .... F01P 11/18; F01P 2025/70; F01P 2031/18; G01M 3/3245; G01M 15/042
USPC ..................................................... 73/114.68
See application file for complete search history.

(56) References Cited

U.S. PATENT DOCUMENTS

| | | | | |
|---|---|---|---|---|
| 3,832,982 | A * | 9/1974 | Guehr ..................... | F01P 11/18 123/41.15 |
| 3,836,253 | A * | 9/1974 | Colvin .................... | G01M 3/38 356/70 |
| 5,656,771 | A * | 8/1997 | Beswick .................. | F01P 11/14 73/114.68 |
| 6,227,038 | B1 * | 5/2001 | Blossfeld ............... | G01M 3/025 210/739 |
| 2005/0204802 | A1 * | 9/2005 | Care ...................... | G01M 3/025 73/40 |
| 2013/0174648 | A1 * | 7/2013 | Ward ................... | B22D 17/2218 73/40 |
| 2013/0197745 | A1 * | 8/2013 | Skelton ............... | G01M 17/007 701/34.4 |
| 2013/0338899 | A1 * | 12/2013 | Worden ................ | G01M 3/025 701/101 |
| 2018/0073418 | A1 * | 3/2018 | Bonkoski .................. | F01P 5/10 |
| 2019/0376869 | A1 * | 12/2019 | Dudar .................... | G01M 3/007 |
| 2020/0240869 | A1 * | 7/2020 | Yesh ................. | H01M 10/6568 |

* cited by examiner

*Primary Examiner* — Eric S. McCall

(57) ABSTRACT

A method of diagnosing a leak in a coolant system of an automobile includes repeatedly measuring the coolant level within the coolant system at a pre-determined time interval, calculating a short term leak rate, wherein the short term leak rate is the rate of coolant leakage over a first pre-determined length of time, calculating a long term leak rate, wherein the long term leak rate is the rate of coolant leakage over a second pre-determined length of time, further wherein the second pre-determined length of time is longer than the first pre-determined length of time, identifying a coolant system leakage state based on a current coolant level within the coolant system, the short term leak rate, and the long term leak rate, and providing notification of the coolant system leakage state to an operator of the vehicle.

20 Claims, 1 Drawing Sheet

COOLANT LEAK DIAGNOSIS

INTRODUCTION

The present disclosure relates to a coolant system for an automobile and a method of monitoring the coolant system and diagnosing coolant leaks within the coolant system. Currently, coolant systems generally do not trigger notification to a driver of a vehicle until the engine of the vehicle is very hot.

When the coolant level is below acceptable operating levels or the engine in over-heated, systems will act to notify the driver and possibly take autonomous action to control the systems within the vehicle to prevent damage to vehicle components. However, when this occurs, it is too late for the operator of the vehicle to take pro-active action to prevent an over-heating event. Further, the vehicle may end up stranded in an inoperable state due to unexpected catastrophic failure.

Thus, while current cooling systems achieve their intended purpose, there is a need for a new and improved method for diagnosing leaks within a coolant system that identifies failure modes based on pattern and severity of leaking, predicts progression of leaking and estimates lead time before failure, provides feedback to vehicle control systems to react to protect engine hardware and maintain vehicle safety, and provides recommended actions to be taken by the operator of the vehicle.

SUMMARY

According to several aspects of the present disclosure, a method of diagnosing a leak in a coolant system of an automobile includes repeatedly measuring the coolant level within the coolant system at a pre-determined time interval, calculating a short term leak rate, wherein the short term leak rate is the rate of coolant leakage over a first pre-determined length of time, calculating a long term leak rate, wherein the long term leak rate is the rate of coolant leakage over a second pre-determined length of time, further wherein the second pre-determined length of time is longer than the first pre-determined length of time, identifying a coolant system leakage state based on a current coolant level within the coolant system, the short term leak rate, and the long term leak rate, and providing notification of the coolant system leakage state to an operator of the vehicle.

According to another aspect of the present disclosure, further including, prior to identifying a coolant system leakage state based on a current coolant level within the coolant system, the short term leak rate, and the long term leak rate: comparing the level of coolant within the coolant system to a pre-determined low coolant threshold, comparing the short term leak rate to a pre-determined short term leak rate threshold, and comparing the long term leak rate to a pre-determined long term leak rate threshold.

According to another aspect of the present disclosure, identifying a coolant system leakage state based on a current coolant level within the coolant system, the short term leak rate, and the long term leak rate further includes: identifying an active leak within the coolant system when the short term leak rate exceeds the short term leak rate threshold, the long term leak rate exceeds the long term leak rate threshold, and the coolant level is below the low coolant threshold.

According to another aspect of the present disclosure, identifying a coolant system leakage state based on a current coolant level within the coolant system, the short term leak rate, and the long term leak rate further includes: identifying an incipient leak within the coolant system when the short term leak rate exceeds the short term leak rate threshold, the long term leak rate exceeds the long term leak rate threshold, and the coolant level is above the low coolant threshold.

According to another aspect of the present disclosure, identifying a coolant system leakage state based on a current coolant level within the coolant system, the short term leak rate, and the long term leak rate further includes: identifying an incipient leak within the coolant system when the short term leak rate exceeds the short term leak rate threshold and the long term leak rate is below the long term leak rate threshold.

According to another aspect of the present disclosure, identifying a coolant system leakage state based on a current coolant level within the coolant system, the short term leak rate, and the long term leak rate further includes: identifying a no leak condition within the coolant system when the short term leak rate is below the short term leak rate threshold and the long term leak rate exceeds the long term leak rate threshold.

According to another aspect of the present disclosure, the method further includes: continuously monitoring a plurality of vehicle operating parameters and environmental conditions during the second pre-determined length of time, evaluating the vehicle operating parameters and environmental conditions during the second pre-determined length of time, and identifying at least one of vehicle operating conditions and environmental conditions that are responsible for the long term leak rate exceeding the long term leak rate threshold.

According to another aspect of the present disclosure, identifying a coolant system leakage state based on a current coolant level within the coolant system, the short term leak rate, and the long term leak rate further includes: identifying a low coolant condition within the coolant system when the short term leak rate is below the short term leak rate threshold, the long term leak rate is below the long term leak rate threshold, and the coolant level is below the low coolant threshold.

According to another aspect of the present disclosure, identifying a coolant system leakage state based on a current coolant level within the coolant system, the short term leak rate, and the long term leak rate further includes: identifying a no leak condition within the coolant system when the short term leak rate is below the short term leak rate threshold, the long term leak rate is below the long term leak rate threshold, and the coolant level is above the low coolant threshold.

According to another aspect of the present disclosure, the method further includes: calculating a time to failure for the coolant system based on the current coolant level and the short term leak rate.

According to another aspect of the present disclosure, the method further includes, after calculating a time to failure for the coolant system based on the current coolant level and the short term leak rate, modifying the time to failure due to environmental and vehicle operating conditions.

According to another aspect of the present disclosure, providing notification of the coolant system leakage state to an operator of the vehicle further includes providing notification of the modified time to failure for the coolant system to the operator of the vehicle.

According to another aspect of the present disclosure, providing notification of the coolant system leakage state to an operator of the vehicle further includes providing recommended actions to be taken by the operator of the vehicle to the operator of the vehicle.

According to another aspect of the present disclosure, the method further includes: implementing vehicle operating restrictions based on the modified time to failure.

According to several aspects of the present disclosure, a method of diagnosing a leak in a coolant system of an automobile comprises: repeatedly measuring or estimating the coolant level within the coolant system at a pre-determined time interval, calculating a short term leak rate, wherein the short term leak rate is the rate of coolant leakage over a first pre-determined length of time, calculating a long term leak rate, wherein the long term leak rate is the rate of coolant leakage over a second pre-determined length of time, further wherein the second pre-determined length of time is longer than the first pre-determined length of time, comparing the level of coolant within the coolant system to a pre-determined low coolant threshold, comparing the short term leak rate to a pre-determined short term leak rate threshold, comparing the long term leak rate to a pre-determined long term leak rate threshold, continuously monitoring a plurality of vehicle operating parameters and environmental conditions during the second pre-determined length of time, identifying a coolant system leakage state based on a current coolant level within the coolant system, the short term leak rate, and the long term leak rate, calculating a time to failure for the coolant system based on the current coolant level and the short term leak rate and modifying the time to failure due to environmental and vehicle operating conditions, and providing notification of the coolant system leakage state, the modified time to failure for the coolant system, and providing recommended actions to be taken to an operator of the vehicle.

According to another aspect of the present disclosure, identifying a coolant system leakage state based on a current coolant level within the coolant system, the short term leak rate, and the long term leak rate further includes: identifying an active leak within the coolant system when the short term leak rate exceeds the short term leak rate threshold, the long term leak rate exceeds the long term leak rate threshold, and the coolant level is below the low coolant threshold.

According to another aspect of the present disclosure, identifying a coolant system leakage state based on a current coolant level within the coolant system, the short term leak rate, and the long term leak rate further includes: identifying an incipient leak within the coolant system when the short term leak rate exceeds the short term leak rate threshold, the long term leak rate exceeds the long term leak rate threshold, and the coolant level is above the low coolant threshold, and when the short term leak rate exceeds the short term leak rate threshold and the long term leak rate is below the long term leak rate threshold.

According to another aspect of the present disclosure, the method further includes: evaluating the vehicle operating parameters and environmental conditions during the second pre-determined length of time, and identifying at least one of vehicle operating conditions and environmental conditions that are responsible for the long term leak rate exceeding the long term leak rate threshold, wherein identifying a coolant system leakage state based on a current coolant level within the coolant system, the short term leak rate, and the long term leak rate further includes: identifying a no leak condition within the coolant system when the short term leak rate is below the short term leak rate threshold and the long term leak rate exceeds the long term leak rate threshold.

According to another aspect of the present disclosure, identifying a coolant system leakage state based on a current coolant level within the coolant system, the short term leak rate, and the long term leak rate further includes: identifying a low coolant condition within the coolant system when the short term leak rate is below the short term leak rate threshold, the long term leak rate is below the long term leak rate threshold, and the coolant level is below the low coolant threshold.

According to another aspect of the present disclosure, identifying a coolant system leakage state based on a current coolant level within the coolant system, the short term leak rate, and the long term leak rate further includes: identifying a no leak condition within the coolant system when the short term leak rate is below the short term leak rate threshold, the long term leak rate is below the long term leak rate threshold, and the coolant level is above the low coolant threshold.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

Figure 1:
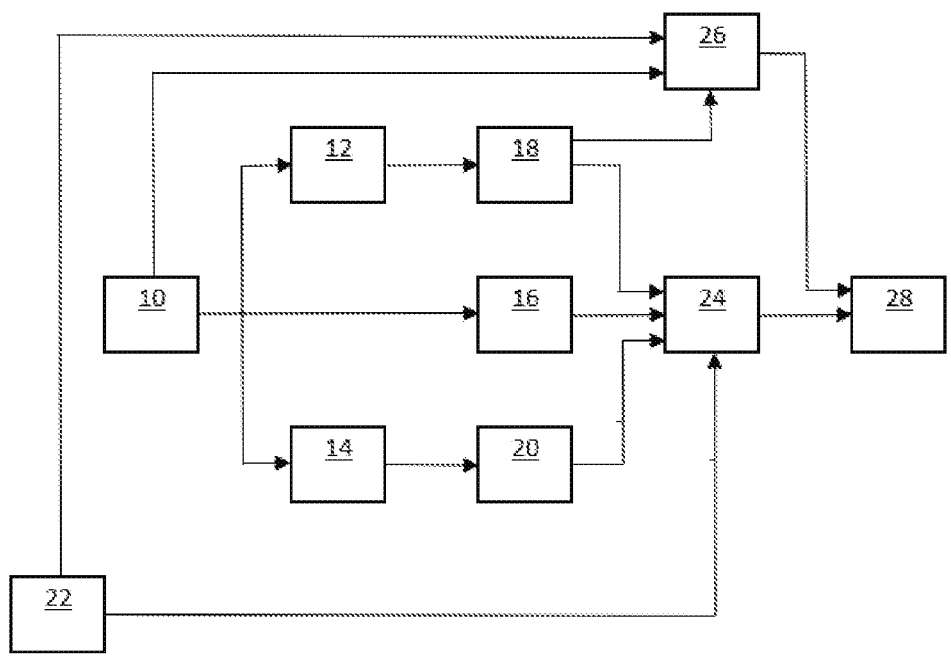
FIG. 1 is a block diagram illustrating a method according to an exemplary embodiment of the present disclosure.

The following description is merely exemplary in nature and is not intended to limit the present disclosure, application, or uses. Referring to FIG. 1, a block diagram illustrating a method of diagnosing a leak in a coolant system of an automobile, in accordance with an exemplary embodiment is shown. Starting at block 10, the method comprises repeatedly measuring the coolant level within the coolant system at a pre-determined time interval. Known methods exist for measuring or estimating the level of coolant within the coolant system. Measuring the coolant level herein may be by, but not limited to, known methods of measuring or estimating the level of coolant within a coolant system. A controller will compile and store the data each time the level of coolant is measured. Measurements are taken once every pre-determined time interval. By way of non-limiting examples, the level of the coolant may be measured once every second, or once every half second.

The controller is a non-generalized, electronic control device having a preprogrammed digital computer or processor, memory or non-transitory computer readable medium used to store data such as control logic, software applications, instructions, computer code, data, lookup tables, etc., and a transceiver or input/output ports. Computer readable medium includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device. Computer code includes any type of program code, including source code, object code, and executable code.

Moving to block 12, the method further includes calculating a short term leak rate. The short term leak rate is the rate of coolant leakage over a first pre-determined length of time. By way of example, the first pre-determined length of time is n minutes. The short term leak rate is calculated by taking the measured coolant level and the previous measured coolant levels during the previous n minutes and calculating a moving average leak rate over the first pre-determined length of time.

Moving to block 14, simultaneously, the method includes calculating a long term leak rate. The long term leak rate is the rate of coolant leakage over a second pre-determined length of time, that is longer than the first pre-determined length of time. By way of example, the second pre-determined length of time is m days, or months. The long term leak rate is calculated by taking the measured coolant level and the previous measured coolant levels during the previous m days or months and calculating a moving average leak rate over the second pre-determined length of time.

Moving to block 16, the method includes comparing the level of coolant within the coolant system to a pre-determined low coolant threshold. The low coolant threshold is a value determined to be the minimum coolant level necessary for efficient cooling. If the coolant level is above the low coolant threshold, the coolant system will operate as intended and provide adequate cooling of the automobile. If the coolant level is below the low coolant threshold, the coolant system will function, but the efficiency of the operation of the coolant system may be affected by aeration and localized boiling in the coolant system.

Moving to block 18, the method further includes comparing the short term leak rate to a pre-determined short term leak rate threshold. The pre-determined short term leak rate threshold is a value that is determined to be a maximum allowable leak rate over the first pre-determined length of time, for safe and efficient operation of the cooling system. Moving to block 20, the method further includes comparing the long term leak rate to a pre-determined long term leak rate threshold. The pre-determined long term leak rate threshold is a value that is determined to be a maximum allowable leak rate over the second pre-determined length of time, for safe and efficient operation of the cooling system.

Referring to block 22, the method includes continuously monitoring a plurality of vehicle operating parameters and environmental conditions during the second pre-determined length of time. The controller compiles these vehicle operating parameters and environmental conditions over the second pre-determined length of time to evaluate how hard the cooling system is working. Vehicle operating parameters may include, but are not limited to, coolant pump speed, fan speed, and fuel consumption rate of the automobile. Environmental conditions may include, but are not limited to, ambient temperature and relative humidity where the automobile is being driven.

Moving to block 24, the controller uses the measured coolant level, the comparison of the calculated short term leak rate to the short term leak rate threshold, the comparison of the calculated long term leak rate to the long term leak rate threshold, and the measured vehicle operating parameters and environmental conditions to identify a coolant system leakage state. Simultaneously, at block 26, the method includes calculating a time to failure for the coolant system based on the current coolant level and the short term leak rate.

The calculated time to failure takes into consideration and is modified, according to environmental and vehicle operating conditions. By way of non-limiting example, the current coolant level and the short term leak rate may indicate that the coolant system will fail within 30 minutes, however, if the vehicle is being driven very hard or if the vehicle is being driven is a very high temperature environment, the controller will use a mathematical model to calculate a more conservative time to failure. The controller will provide the time to failure to the operator of the vehicle in terms of minutes, when the time to failure is short, for instance less than ten minutes. Alternatively, if the time to failure is far off, for instance more than an hour, the controller may provide the time to failure information to the operator of the vehicle in terms of miles that can likely be travelled before coolant system failure.

Moving to block 28, the controller uses the identified leak state of the coolant system, the modified time to failure for the coolant system to provide notification of the coolant system leakage state, the modified time to failure for the coolant system, and recommended actions to be taken to an operator of the vehicle.

Figure 2:
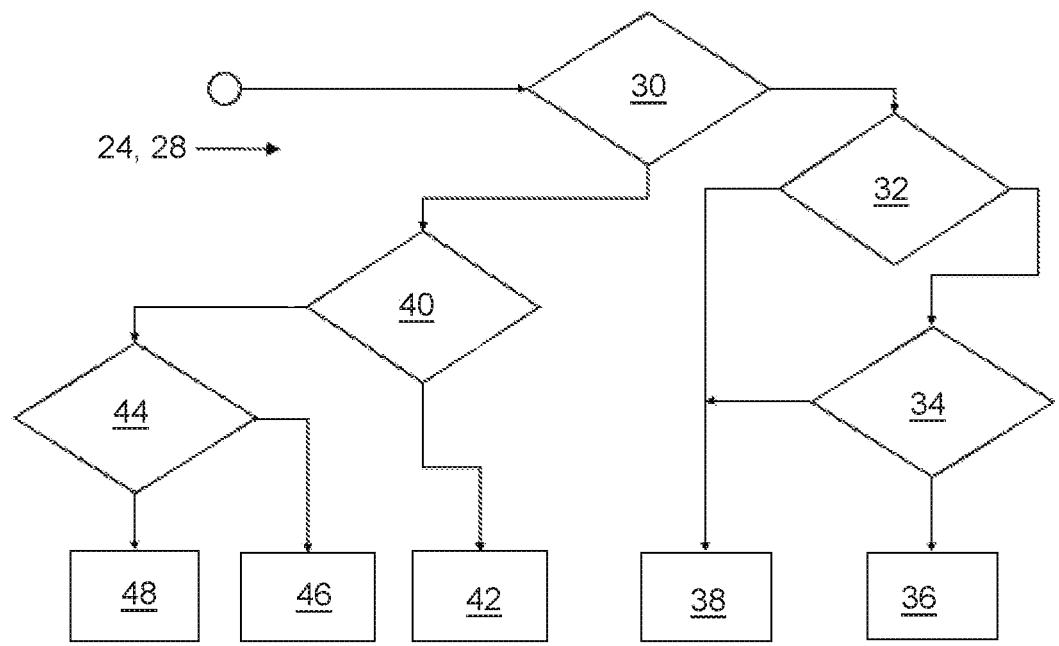
FIG. 2 is a flow chart illustrating aspects of the method shown in FIG. 1.

Referring to FIG. 2, a flow chart of the process identifying a coolant system leakage state, from block 24 and providing notification of the coolant system leakage state, the modified time to failure for the coolant system, and recommended actions to be taken to an operator of the vehicle, from block 28 is shown.

The controller identifies an active leak within the coolant system when the short term leak rate exceeds the short term leak rate threshold, the long term leak rate exceeds the long term leak rate threshold, and the coolant level is below the low coolant threshold. Starting at block 30, the controller compares the calculated short term leak rate to the short term leak rate threshold. If the calculated short term leak rate exceeds the short term leak rate threshold, the flow chart continues to block 32. At block 32, the controller compares the calculated long term leak rate to the long term leak rate threshold. If the calculated long term leak rate exceeds the long term leak rate threshold, the flow chart continues to block 34. At block 34, the controller compares the lever of coolant in the coolant system to the low coolant threshold. If the level of coolant is below the low coolant level threshold, the flow chart continues to block 36, where the controller identifies an active leak in the coolant system and sends a notification to the operator of the vehicle.

In an exemplary embodiment, the controller will inform the operator of the vehicle that there is an active leak in the coolant system and recommend that the operator of the vehicle visit a service station to have the coolant system checked immediately to avoid over-heating and damaging the vehicle. In an exemplary embodiment, the controller will communicate with vehicle control systems to autonomously shut the vehicle down or place the vehicle into a limited power or "limp home" mode, when continued operation of the vehicle may result in over-heating and damage to vehicle components.

The controller identifies an intermittent leak within the coolant system when the short term leak rate exceeds the short term leak rate threshold, the long term leak rate exceeds the long term leak rate threshold, and the coolant level is above the low coolant threshold. Referring again to FIG. 2, starting at block 30, the controller compares the calculated short term leak rate to the short term leak rate threshold. If the calculated short term leak rate exceeds the short term leak rate threshold, the flow chart continues to block 32. At block 32, the controller compares the calculated long term leak rate to the long term leak rate threshold. If the calculated long term leak rate exceeds the long term leak rate threshold, the flow chart continues to block 34. At block 34, the controller compares the level of coolant in the coolant system to the low coolant threshold. If the level of coolant is above the low coolant level threshold, the flow chart continues to block 38, where the controller identifies an intermittent leak in the coolant system and sends a notification to the operator of the vehicle. In an exemplary embodiment, the controller will inform the operator of the vehicle that there is an intermittent leak in the coolant system and recommend that the operator of the vehicle visit a service station to have the coolant system checked.

The controller also identifies an intermittent leak within the coolant system when the short term leak rate exceeds the short term leak rate threshold, the long term leak rate is below the long term leak rate threshold. Referring again to FIG. 2, starting at block 30, the controller compares the calculated short term leak rate to the short term leak rate threshold. If the calculated short term leak rate exceeds the short term leak rate threshold, the flow chart continues to block 32. At block 32, the controller compares the calculated long term leak rate to the long term leak rate threshold. If the calculated long term leak rate is below the long term leak rate threshold, the flow chart continues to block 38, where the controller identifies an intermittent leak in the coolant system and sends a notification to the operator of the vehicle. In an exemplary embodiment, the controller will inform the operator of the vehicle that there is an intermittent leak in the coolant system and recommend that the operator of the vehicle visit a service station to have the coolant system checked.

The controller identifies a no leak condition within the coolant system when the short term leak rate is below the short term leak rate threshold and the long term leak rate exceeds the long term leak rate threshold. Starting at block 30, the controller compares the calculated short term leak rate to the short term leak rate threshold. If the calculated short term leak rate is below the short term leak rate threshold, the flow chart continues to block 40. At block 40, the controller compares the calculated long term leak rate to the long term leak rate threshold. If the calculated long term leak rate is above the long term leak rate threshold, the flow chart continues to block 42, where the controller identifies no leak in the coolant system and sends a notification to the operator of the vehicle.

In addition, the controller evaluates the vehicle operating parameters and environmental conditions during the second pre-determined length of time to identify at least one of vehicle operating conditions and environmental conditions that are responsible for the long term leak rate exceeding the long term leak rate threshold. When the short term leak rate is below the short term leak threshold, there is no active leak. Therefore, the long term leak rate exceeding the long term leak rate threshold is an indication that there was an isolated incident during the second pre-determined length of time. By way of non-limiting example, such incident may be due to the vehicle being driven very hard, at high engine RPMs, or that the vehicle is being driven in extremely high temperatures, causing the coolant system to work very hard to keep the vehicle within acceptable operating temperatures.

The controller identifies a low coolant condition within the coolant system when the short term leak rate is below the short term leak rate threshold, the long term leak rate is below the long term leak rate threshold, and the coolant level is below the low coolant threshold. Starting at block 30, the controller compares the calculated short term leak rate to the short term leak rate threshold. If the calculated short term leak rate is below the short term leak rate threshold, the flow chart continues to block 40. At block 40, the controller compares the calculated long term leak rate to the long term leak rate threshold. If the calculated long term leak rate is below the long term leak rate threshold, the flow chart continues to block 44. At block 44, the controller compares the level of coolant in the coolant system to the low coolant threshold. If the level of coolant is below the low coolant level threshold, the flow chart continues to block 46, where the controller identifies that there are no leaks in the coolant system, but that the coolant level in the coolant system is low, and sends a notification to the operator of the vehicle. In an exemplary embodiment, the controller will provide a recommendation to the operator of the vehicle to add coolant to the coolant system at the earliest opportunity.

The controller further identifies a no leak condition within the coolant system when the short term leak rate is below the short term leak rate threshold, the long term leak rate is below the long term leak rate threshold, and the coolant level is above the low coolant threshold. Starting at block 30, the controller compares the calculated short term leak rate to the short term leak rate threshold. If the calculated short term leak rate is below the short term leak rate threshold, the flow chart continues to block 40. At block 40, the controller compares the calculated long term leak rate to the long term leak rate threshold. If the calculated long term leak rate is below the long term leak rate threshold, the flow chart continues to block 44. At block 44, the controller compares the level of coolant in the coolant system to the low coolant threshold. If the level of coolant is above the low coolant level threshold, the flow chart continues to block 48, where the controller identifies that there are no leaks in the coolant system. In this instance, the controller will not send a notification to the operator of the vehicle. A notification is only sent to the operator of the vehicle when there is a condition that may need attention immediately or in the near future.

A method of the present disclosure offers several advantages. These include identifying failure modes within the coolant system based on pattern and severity of leaking, predicting progression of leaking and estimating lead time before failure, providing feedback to vehicle control systems to react to protect engine hardware and maintain vehicle safety, and providing recommended actions to be taken by the operator of the vehicle.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A method of diagnosing a leak in a coolant system of an automobile, comprising:
   repeatedly measuring the coolant level within the coolant system at a pre-determined time interval;
   calculating a short term leak rate, wherein the short term leak rate is the rate of coolant leakage over a first pre-determined length of time;
   calculating a long term leak rate, wherein the long term leak rate is the rate of coolant leakage over a second pre-determined length of time, further wherein the second pre-determined length of time is longer than the first pre-determined length of time;
   identifying a coolant system leakage state based on a current coolant level within the coolant system, the short term leak rate, and the long term leak rate; and
   providing notification of the coolant system leakage state to an operator of the vehicle.

2. The method of claim 1, further including, prior to identifying a coolant system leakage state based on a current coolant level within the coolant system, the short term leak rate, and the long term leak rate:
comparing the level of coolant within the coolant system to a pre-determined low coolant threshold;
comparing the short term leak rate to a pre-determined short term leak rate threshold; and
comparing the long term leak rate to a pre-determined long term leak rate threshold.

3. The method of claim 2, wherein identifying a coolant system leakage state based on a current coolant level within the coolant system, the short term leak rate, and the long term leak rate further includes: identifying an active leak within the coolant system when the short term leak rate exceeds the short term leak rate threshold, the long term leak rate exceeds the long term leak rate threshold, and the coolant level is below the low coolant threshold.

4. The method of claim 2, wherein identifying a coolant system leakage state based on a current coolant level within the coolant system, the short term leak rate, and the long term leak rate further includes: identifying an incipient leak within the coolant system when the short term leak rate exceeds the short term leak rate threshold, the long term leak rate exceeds the long term leak rate threshold, and the coolant level is above the low coolant threshold.

5. The method of claim 2, wherein identifying a coolant system leakage state based on a current coolant level within the coolant system, the short term leak rate, and the long term leak rate further includes: identifying an incipient leak within the coolant system when the short term leak rate exceeds the short term leak rate threshold and the long term leak rate is below the long term leak rate threshold.

6. The method of claim 2, wherein identifying a coolant system leakage state based on a current coolant level within the coolant system, the short term leak rate, and the long term leak rate further includes: identifying a no leak condition within the coolant system when the short term leak rate is below the short term leak rate threshold and the long term leak rate exceeds the long term leak rate threshold.

7. The method of claim 6, further including:
continuously monitoring a plurality of vehicle operating parameters and environmental conditions during the second pre-determined length of time;
evaluating the vehicle operating parameters and environmental conditions during the second pre-determined length of time;
identifying at least one of vehicle operating conditions and environmental conditions that are responsible for the long term leak rate exceeding the long term leak rate threshold.

8. The method of claim 2, wherein identifying a coolant system leakage state based on a current coolant level within the coolant system, the short term leak rate, and the long term leak rate further includes: identifying a low coolant condition within the coolant system when the short term leak rate is below the short term leak rate threshold, the long term leak rate is below the long term leak rate threshold, and the coolant level is below the low coolant threshold.

9. The method of claim 2, wherein identifying a coolant system leakage state based on a current coolant level within the coolant system, the short term leak rate, and the long term leak rate further includes: identifying a no leak condition within the coolant system when the short term leak rate is below the short term leak rate threshold, the long term leak rate is below the long term leak rate threshold, and the coolant level is above the low coolant threshold.

10. The method of claim 1, further including: calculating a time to failure for the coolant system based on the current coolant level and the short term leak rate.

11. The method of claim 10, further including, after calculating a time to failure for the coolant system based on the current coolant level and the short term leak rate, modifying the time to failure due to environmental and vehicle operating conditions.

12. The method of claim 11, wherein providing notification of the coolant system leakage state to an operator of the vehicle further includes providing notification of the modified time to failure for the coolant system to the operator of the vehicle.

13. The method of claim 11, wherein providing notification of the coolant system leakage state to an operator of the vehicle further includes providing recommended actions to be taken by the operator of the vehicle to the operator of the vehicle.

14. The method of claim 11, further including implementing vehicle operating restrictions based on the modified time to failure.

15. A method of diagnosing a leak in a coolant system of an automobile, comprising:
repeatedly measuring the coolant level within the coolant system at a pre-determined time interval;
calculating a short term leak rate, wherein the short term leak rate is the rate of coolant leakage over a first pre-determined length of time;
calculating a long term leak rate, wherein the long term leak rate is the rate of coolant leakage over a second pre-determined length of time, further wherein the second pre-determined length of time is longer than the first pre-determined length of time;
comparing the level of coolant within the coolant system to a pre-determined low coolant threshold;
comparing the short term leak rate to a pre-determined short term leak rate threshold;
comparing the long term leak rate to a pre-determined long term leak rate threshold;
continuously monitoring a plurality of vehicle operating parameters and environmental conditions during the second pre-determined length of time;
identifying a coolant system leakage state based on a current coolant level within the coolant system, the short term leak rate, and the long term leak rate;
calculating a time to failure for the coolant system based on the current coolant level and the short term leak rate and modifying the time to failure due to environmental and vehicle operating conditions; and
providing notification of the coolant system leakage state, the modified time to failure for the coolant system, and providing recommended actions to be taken to an operator of the vehicle.

16. The method of claim 15, wherein identifying a coolant system leakage state based on a current coolant level within the coolant system, the short term leak rate, and the long term leak rate further includes: identifying an active leak within the coolant system when the short term leak rate exceeds the short term leak rate threshold, the long term leak rate exceeds the long term leak rate threshold, and the coolant level is below the low coolant threshold.

17. The method of claim 15, wherein identifying a coolant system leakage state based on a current coolant level within the coolant system, the short term leak rate, and the long term leak rate further includes: identifying an incipient leak within the coolant system when the short term leak rate exceeds the short term leak rate threshold, the long term leak rate exceeds the long term leak rate threshold, and the coolant level is above the low coolant threshold, and when the short term leak rate exceeds the short term leak rate threshold and the long term leak rate is below the long term leak rate threshold.

18. The method of claim 15, further including evaluating the vehicle operating parameters and environmental conditions during the second pre-determined length of time, and identifying at least one of vehicle operating conditions and environmental conditions that are responsible for the long term leak rate exceeding the long term leak rate threshold, wherein identifying a coolant system leakage state based on a current coolant level within the coolant system, the short term leak rate, and the long term leak rate further includes: identifying a no leak condition within the coolant system when the short term leak rate is below the short term leak rate threshold and the long term leak rate exceeds the long term leak rate threshold.

19. The method of claim 15, wherein identifying a coolant system leakage state based on a current coolant level within the coolant system, the short term leak rate, and the long term leak rate further includes: identifying a low coolant condition within the coolant system when the short term leak rate is below the short term leak rate threshold, the long term leak rate is below the long term leak rate threshold, and the coolant level is below the low coolant threshold.

20. The method of claim 15, wherein identifying a coolant system leakage state based on a current coolant level within the coolant system, the short term leak rate, and the long term leak rate further includes: identifying a no leak condition within the coolant system when the short term leak rate is below the short term leak rate threshold, the long term leak rate is below the long term leak rate threshold, and the coolant level is above the low coolant threshold.

* * * * *